United States Patent
Reisenauer et al.

(10) Patent No.: US 7,784,969 B2
(45) Date of Patent: Aug. 31, 2010

(54) LED BASED LIGHT ENGINE

(75) Inventors: William Reisenauer, Commack, NY (US); Michael Fusco, Smithtown, NY (US); Wojciech Pawelko, Deer Park, NY (US)

(73) Assignee: BHC Interim Funding III, L.P., New York, NY (US)

( * ) Notice: Subject to any disclaimer, the term of this patent is extended or adjusted under 35 U.S.C. 154(b) by 0 days.

(21) Appl. No.: 11/589,548

(22) Filed: Oct. 30, 2006

(65) Prior Publication Data

US 2007/0242461 A1 Oct. 18, 2007

Related U.S. Application Data

(60) Provisional application No. 60/791,482, filed on Apr. 12, 2006.

(51) Int. Cl.
*F21V 29/00* (2006.01)
*B60Q 1/06* (2006.01)
*H01R 33/00* (2006.01)

(52) U.S. Cl. .................. 362/294; 362/373; 362/650

(58) Field of Classification Search .................. 362/294, 362/373, 650
See application file for complete search history.

(56) References Cited

U.S. PATENT DOCUMENTS

| | | | | |
|---|---|---|---|---|
| 4,841,422 A * | 6/1989 | Groh | ............................ | 362/294 |
| 4,872,097 A * | 10/1989 | Miller | ......................... | 362/649 |
| 5,857,767 A | 1/1999 | Hochstein | | |
| 5,947,590 A * | 9/1999 | Meuse et al. | .................. | 362/264 |
| 6,045,240 A | 4/2000 | Hochstein | | |
| 6,161,910 A * | 12/2000 | Reisenauer et al. | .......... | 315/309 |
| 6,367,949 B1 | 4/2002 | Pederson | | |
| 6,371,636 B1 * | 4/2002 | Wesson | ........................ | 362/545 |
| 6,428,189 B1 | 8/2002 | Hochstein | | |
| 6,462,475 B1 * | 10/2002 | Lee | ............................... | 315/57 |
| 6,517,218 B2 | 2/2003 | Hochstein | | |
| 6,578,994 B1 | 6/2003 | Beyerlein | | |
| 6,787,999 B2 * | 9/2004 | Stimac et al. | .................. | 315/51 |
| 6,791,840 B2 | 9/2004 | Chun | | |
| 6,796,698 B2 * | 9/2004 | Sommers et al. | ............. | 362/555 |
| 6,799,864 B2 * | 10/2004 | Bohler et al. | ................ | 362/236 |
| 6,864,513 B2 * | 3/2005 | Lin et al. | ........................ | 257/99 |
| 6,942,360 B2 | 9/2005 | Chou et al. | | |
| 6,948,829 B2 * | 9/2005 | Verdes et al. | ................ | 362/227 |
| 6,964,501 B2 | 11/2005 | Ryan | | |
| 6,982,518 B2 | 1/2006 | Chou et al. | | |
| 7,198,387 B1 * | 4/2007 | Gloisten et al. | ............. | 362/294 |
| 7,255,460 B2 * | 8/2007 | Lee | ............................. | 362/294 |

(Continued)

*Primary Examiner*—Jacob Y Choi
*Assistant Examiner*—David J Makiya
(74) *Attorney, Agent, or Firm*—Gerald E. Hespos; Michael J. Porco

(57) ABSTRACT

A light emitting diode (LED) based light engine that can replace a conventional PAR type bulb with no modifications to a host lighting fixture is provided. The light engine includes a thermally conductive housing including a generally cylindrical wall defining a cavity, an outer surface of the wall includes a plurality of axially radiating fins and disposed on an inner surface of the wall is an annular center wall dividing the cavity into a first, upper cavity and a second, lower cavity; a light module including at least one LED is disposed in the first, upper cavity and configured to contact the annular center wall, wherein heat generated by the at least one LED is disposed in the second, lower cavity and electrically coupled to the light module.

10 Claims, 9 Drawing Sheets

U.S. PATENT DOCUMENTS

| | | |
|---|---|---|
| 7,396,142 B2 * | 7/2008 | Laizure et al. .............. 362/240 |
| 2004/0120156 A1 * | 6/2004 | Ryan .......................... 362/373 |
| 2004/0184272 A1 | 9/2004 | Wright et al. |
| 2004/0264195 A1 | 12/2004 | Chaung et al. |
| 2005/0073840 A1 | 4/2005 | Chou et al. |
| 2005/0111234 A1 * | 5/2005 | Martin et al. .............. 362/555 |
| 2005/0174780 A1 * | 8/2005 | Park .......................... 362/294 |
| 2006/0013002 A1 | 1/2006 | Coushaine et al. |
| 2006/0227558 A1 * | 10/2006 | Osawa et al. ................ 362/351 |
| 2006/0274529 A1 * | 12/2006 | Cao .......................... 362/294 |
| 2007/0230186 A1 * | 10/2007 | Chien ........................ 362/294 |
| 2008/0112168 A1 * | 5/2008 | Pickard et al. .............. 362/247 |

\* cited by examiner

LED BASED LIGHT ENGINE

PRIORITY

This application claims priority to an application entitled "LED BASED LIGHT ENGINE" filed in the United States Patent and Trademark Office on Apr. 12, 2006 and assigned Ser. No. 60/791,482, the contents of which are hereby incorporated by reference.

BACKGROUND

1. Field

The present disclosure relates generally to light bulbs and lamp assemblies, and more particularly, to a light emitting diode (LED) based light engine that can replace a conventional PAR30 or PAR20 incandescent bulb used in outdoor/exterior light fixtures with no modifications to the host lighting fixture.

2. Description of the Related Art

Incandescent light bulbs are used in a large variety of lighting products. Although inexpensive to purchase, incandescent light bulbs have several drawbacks. First, incandescent light bulbs use a relatively large amount of power compared to other lighting products which increase energy costs. Second, incandescent light bulbs have a short life causing repetitive replacement costs. Furthermore, since theses bulbs have a short life, labor costs will subsequently be effected by having maintenance personnel constantly replace the bulbs.

Recently, a trend in the lighting industry is to develop light emitting diode (LED) light modules that can be easily adapted to current light fixture products. LED technology offers more than twice the energy efficiency of traditional incandescent bulbs and has 20-30 times the reliability. This offers a potentially large savings in energy in outdoor/exterior applications, where many PAR30/PAR20 bulbs are used today. While LED technology is generally more expensive, there can be a substantial savings in bulb replacement and maintenance costs over a 5-year or greater life-cycle.

To-date, most LED based light bulbs that are intended to replace traditional light bulbs use a large number of low power LEDs (e.g., 5 mm or 20 mA surface mount LEDs) to produce the required light output. This approach has an advantage of simplifying the electronics, since large strings of LEDs can have a voltage drop that is closely matched to the source voltage (e.g. 120 VAC). The disadvantages with this approach are that the 5 mm LEDs do not offer the same service life as higher power LEDs, large quantities of 20 mA surface mount LEDs are more expensive than using fewer high power LEDs, and the light pattern produced is more difficult to control when using a wide area light source (i.e. a large array of LEDs make it more difficult to produce a narrow spotlight).

Thus, a need exists for an LED lighting product having low power consumption and long life. Furthermore, a need exists for an LED based light engine that can be a drop-in/screw-in replacement for a PAR30/PAR20 bulb, wherein the light engine can be easily retrofitted into existing light fixtures at residential and commercial installations.

SUMMARY

An LED based light engine designed to be easily retrofitted into existing incandescent based light fixtures with minimum or no modification is provided. The LED lamp module of the present disclosure permits lighting fixture manufacturers or end-user customers to realize the benefits of LED technology, e.g., more energy efficient and longer life than incandescent, while minimizing the impact to current light fixture designs.

According to an aspect of the present disclosure, an LED based light engine includes an LED light module for producing light and a housing for supporting the LED light module and a high power, compact, integrated electronic current driver board. The housing includes a heat sink mechanism, e.g., fins, for moving heat away from the LEDs of the LED light module and the electronic components via radiation, conduction and convective methods. The engine further includes a base for coupling the current driver board to a conventional power source and a window or lens for sealing the engine against the environment (e.g., moisture, dust, etc.).

The LED based light engine of the present disclosure utilizes, high power (3 Watt type) LEDs with optics to produce narrow, medium or wide illumination patterns and an electronic regulation circuit which converts line voltage (e.g. 115 VAC or 220 VAC) to the voltage required of a 3, 5, or other LED array (i.e. 12 volts, 20 volts, etc.), while maintaining a constant current of 700 mA, 1,000 mA or higher. To enable the LED based light engine of the present disclosure to be a screw-in replacement, the electronic regulation circuit is disposed internal to the housing of the engine. The challenge, when designing high power LED lamps, is to dissipate the LED generated heat as well as the electronics generated heat while keeping the junction temperatures of the LEDs and electronics well within their specification limits to ensure long life (e.g., in excess of 30,000 hours). The light engine of the present disclosure achieves this with an efficient thermal management design. In addition, it is very challenging to design a 15 Watt or 25 Watt electronic regulation circuit within the limited volume in a PAR20 or PAR30 form factor while still attaining high efficiency, and high performance in other properties such as EMI, Power Factor, etc. The light engine of the present disclosure achieves this with a compact integrated electronics driver circuit board.

BRIEF DESCRIPTION OF THE DRAWINGS

The above and other aspects, features, and advantages of the present disclosure will become more apparent in light of the following detailed description when taken in conjunction with the accompanying drawings in which:

FIG. 8B is a bottom view of an electronic board, FIG. 8C is a top view of the electronics board and FIG.

Figure 8A:
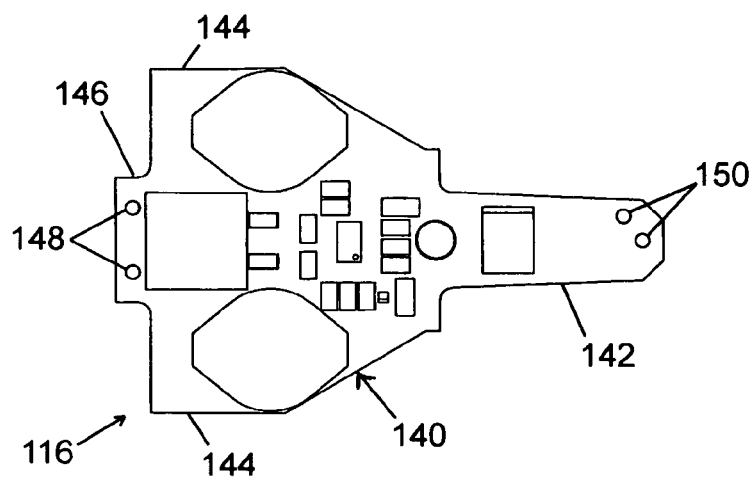
FIG. 8A is a perspective view of an integrated electronics driver circuit board in accordance with an embodiment of the present disclosure.
Figure 8B:
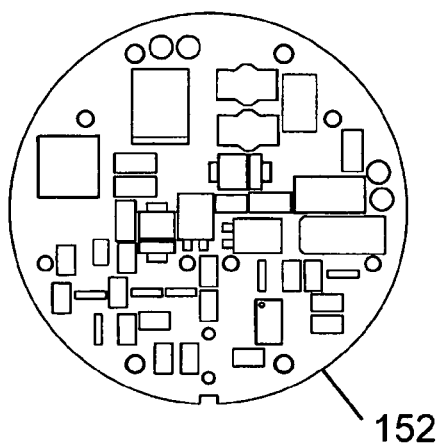
FIGS. 8B-8D illustrate another embodiment of a driver circuit board where
Figure 8C:
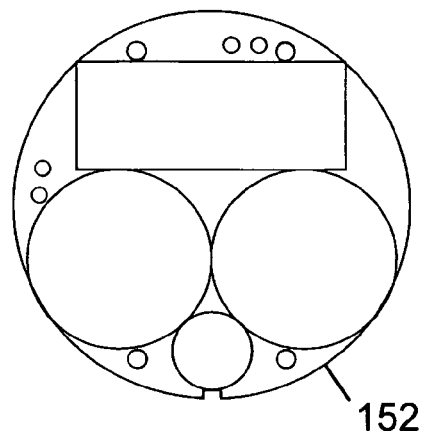
Figure 8D:
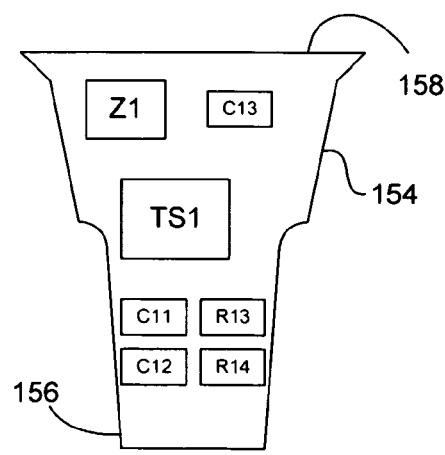
Figure 9:
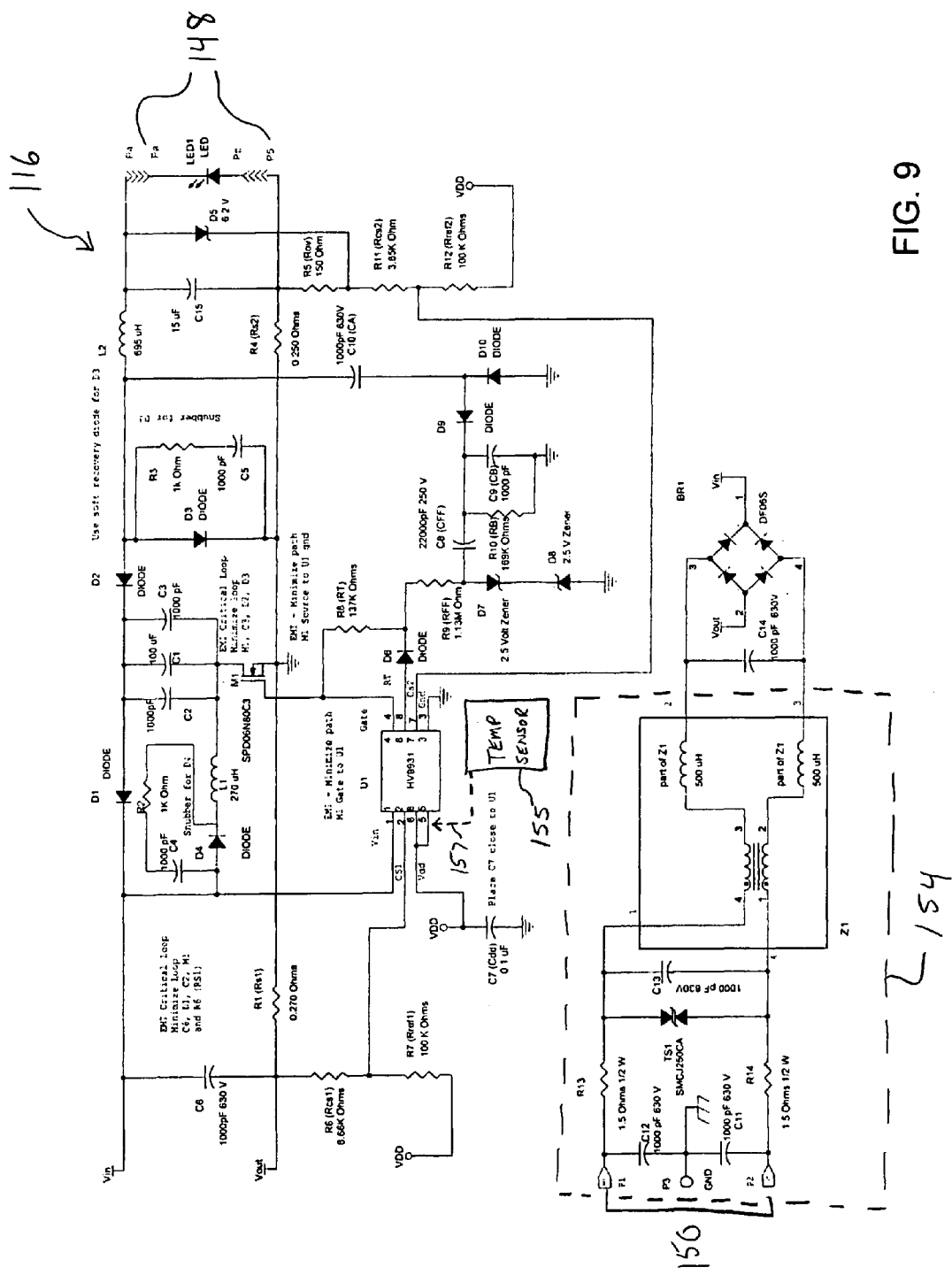
Figure 11:
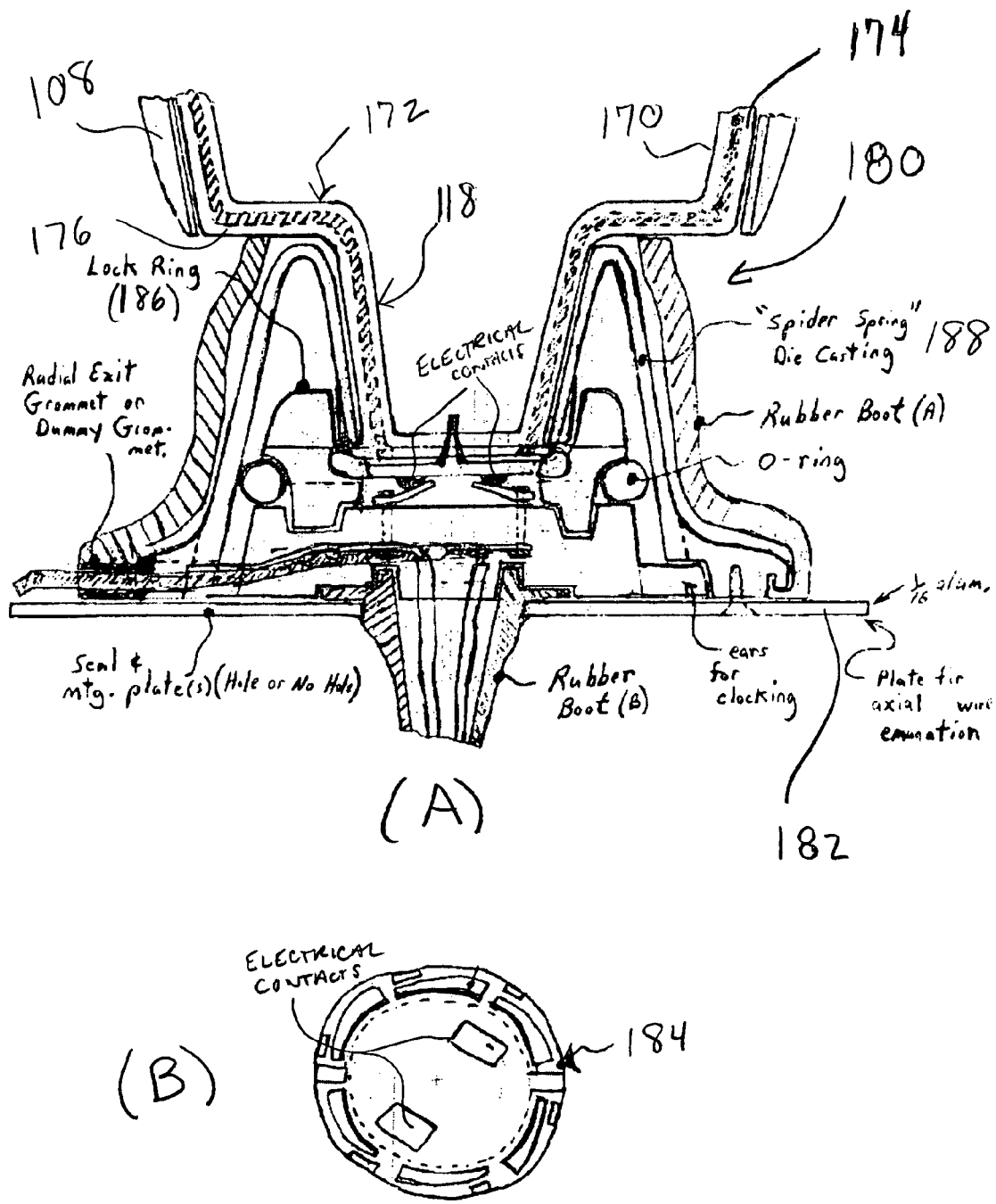
Figure 12:
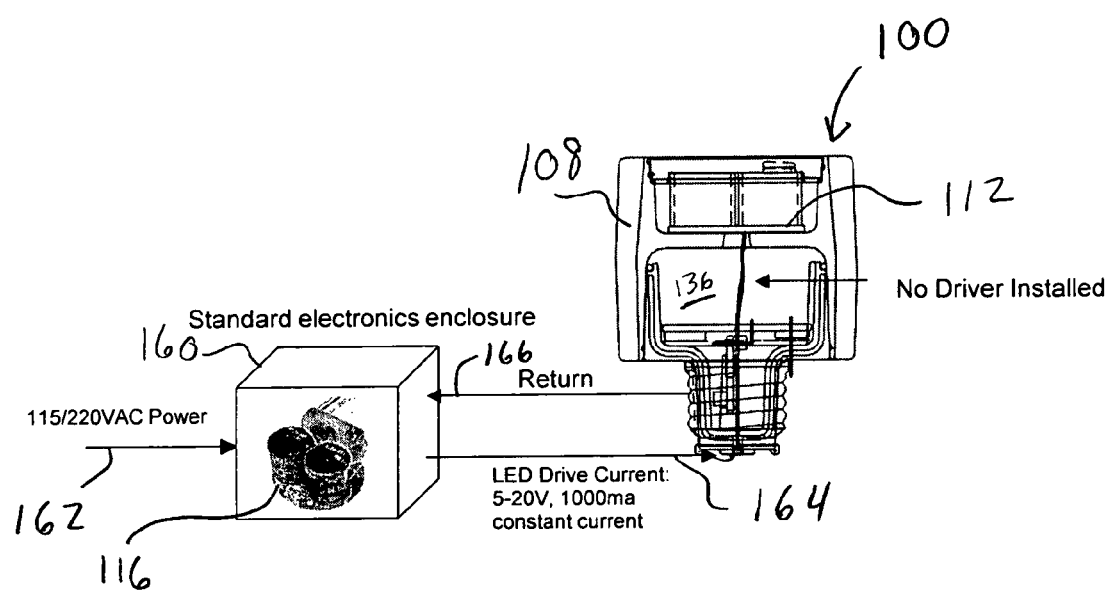

8D is input power filter board which is mounted perpendicular to the board shown in FIGS. 8B and 8C;

FIG. 9 is a schematic diagram of the driver circuit shown in FIG. 8;

FIG. 10A is a cross sectional view of a base of the LED based light engine, FIG. 10B is a top plan view of the base, FIG. 10C is a cross sectional view of a "Edison type" screw connection used with the base shown in FIG. 10A and FIG. 10D is a perspective view of a base attached to a housing in accordance with the present invention;

FIG. 11A is a cross sectional view of a hard mount receptacle connection and FIG. 11B is a bottom view of a twist lock base used in conjunction with the base of FIG. 10A; and FIG. 12 illustrates another embodiment of an LED based light engine where the electronics driver circuit board is mounted remotely from the housing of the light engine.

DETAILED DESCRIPTION

Preferred embodiments of the present disclosure will be described hereinbelow with reference to the accompanying drawings. In the following description, well-known functions or constructions are not described in detail to avoid obscuring the invention in unnecessary detail. Throughout the drawings, like reference numerals represent like elements.

Figure 1:
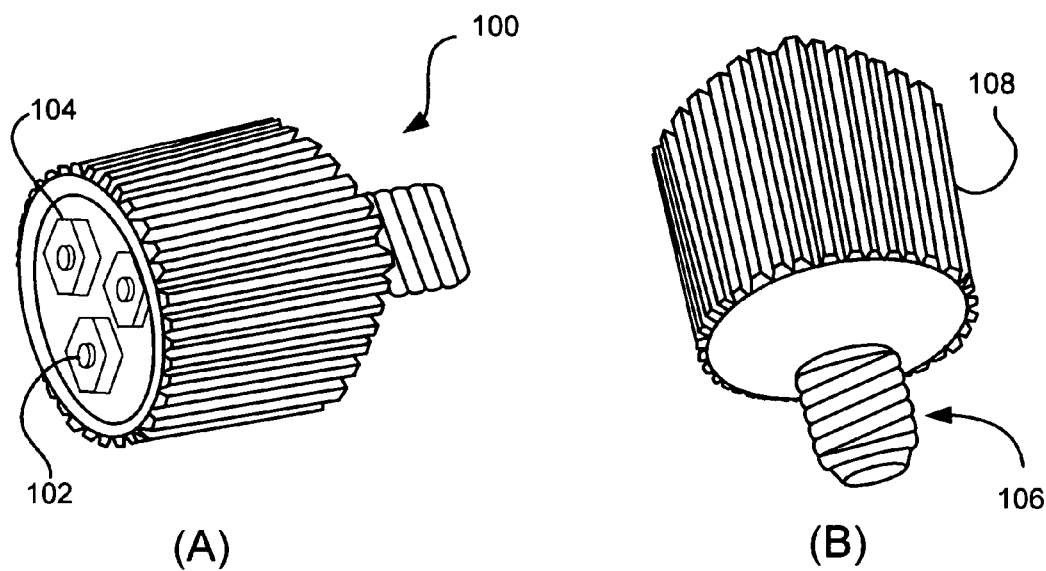
FIG. 1A is perspective view of a LED based light engine in accordance with an embodiment of the present disclosure.
FIG. 1B is a bottom perspective view of the LED based light engine shown in FIG. 1B.

Referring to FIG. 1, an embodiment of the LED based light engine 100 of the present disclosure is illustrated as a replacement for a PAR20 lamp. The LED PAR20 lamp is intended to provide a much more energy efficient and reliable alternative to a standard incandescent 35 Watt PAR20 bulb. It is designed to provide approximately 50% energy savings and a 7 year service life. It will generate an amount of light approximately equivalent to the 35 Watt PAR20 bulb while using less than half of the energy (<17 Watts). The LED based light engine uses an array of 3 high power LEDs 102 generating approximately 100 lumens each for a total of 300 lumens in generated light. It uses high efficiency optical elements 104 (>75% efficient) to direct the light into 6° (narrow spot) or 25° (narrow flood) light patterns and can support LEDs of various color temperatures to produce white in 3000 K, 4000K, 5500K or other color temperatures or discrete colors (e.g. red, green, blue, amber, etc.).

The LED based light engine 100 is designed with the same diameter and height of a PAR 20 bulb so that it can fit into existing lighting fixtures designed for a PAR 20 bulb. It has two methods of connection: 1) uses a standard Edison socket and 2) a dedicated hard mount receptacle. The use of a standard Edison socket, as shown in FIG. 1B, allows it to directly screw into an existing light fixture, and makes it retrofittable into millions of existing light fixtures that are installed in commercial and residential buildings today. Traditional "Edison style" light sockets are generally made of a ceramic material to insulate the host light fixture from heat. Alternatively, the hard receptacle of the present disclosure, as show in FIG. 11, provides the advantage of actually conducting heat away from the LED based light engine 100 and into the host light fixture which is generally made of a conducting metallic material with a large surface area for further heat dissipation, an exemplary host fixture is shown in FIG. 2.

Figure 2:
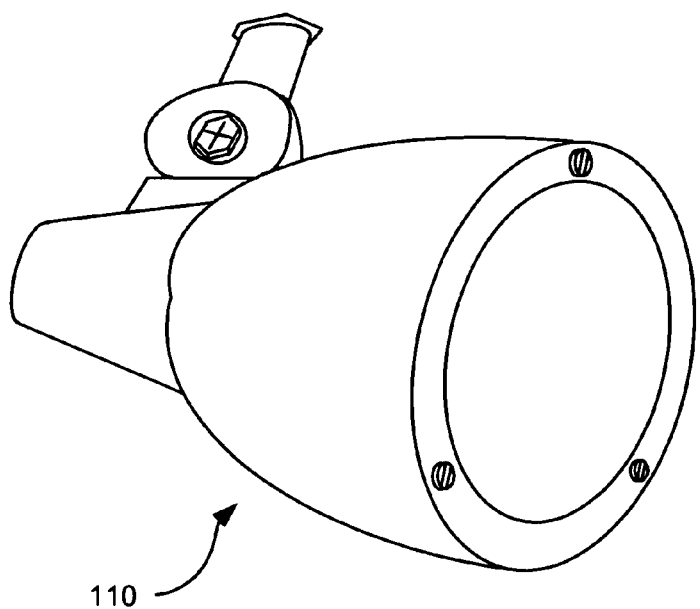
FIG. 2 is a perspective view of an exemplary host lighting fixture to be used in conjunction with the LED based light engine of the present disclosure.

The main housing 108 of the LED based light engine 100 is designed to transfer heat via convection or radiation mechanisms to the host light fixture 110 as shown in FIG. 2. The LED light engine 100 is intended to support closed host fixture designs (e.g., sealed unit, no air flow) or open fixtures (e.g., with ambient airflow). The heat sink housing 108 is specifically designed to be as efficient as possible in transferring heat to an enclosing cylindrical structure, such as the host lighting fixture 110, and to transfer 17 Watts of energy (25 Watts for the PAR 30 version) through the host fixture to the outside ambient environment. The LEDs are mounted on a metal core PCB which is directly mated to the housing 108 to enable maximum amount of heat flow from the LEDs to the heat sink housing. This allows LED junction and electronics temperatures to be maintained within defined limits to ensure long product life (>30,000 hours).

An integrated and highly compact electronics current driver board provides constant current to the LED devices through conversion of standard line voltage (115/220/270 VAC). The driver electronics is designed for 75% or greater efficiency to minimize additional heat build up in the light engine and to maximize energy savings over standard PAR bulbs. The electronics also provides EMI filtering to meet FCC Class B requirements and transient protection to guard against input power fluctuations. The electronics provide Power Factor correction (>90%) which improves its compatibility with utility generated power distribution systems. In addition, the driver electronics is designed to meet safety standards (e.g. UL) established for 120 VAC lighting systems. The electronics design uses high reliability components with temperature specifications that will support the total system reliability. The LED based light engine of the present disclosure is designed for a 30,000 hour life while enclosed within a metallic host light fixture that is in an outside ambient air environment of 90 degrees F. or less, on average. The electronics are integrated within the housing in a manner to maximize heat transfer from the printed circuit board (PCB) to the metal housing/heat sink, as will be illustrated below. The LED based light engine is sealed to prevent moisture and dust intrusion. The design uses materials that, to a great degree, are recyclable.

Another embodiment of the present disclosure uses a similar approach to replace a PAR30, 50 Watt incandescent lamp. In this case, a 5-high power LED light module is used and the overall product diameter and height are the same as a conventional PAR30 "short neck" bulb.

Figure 3:
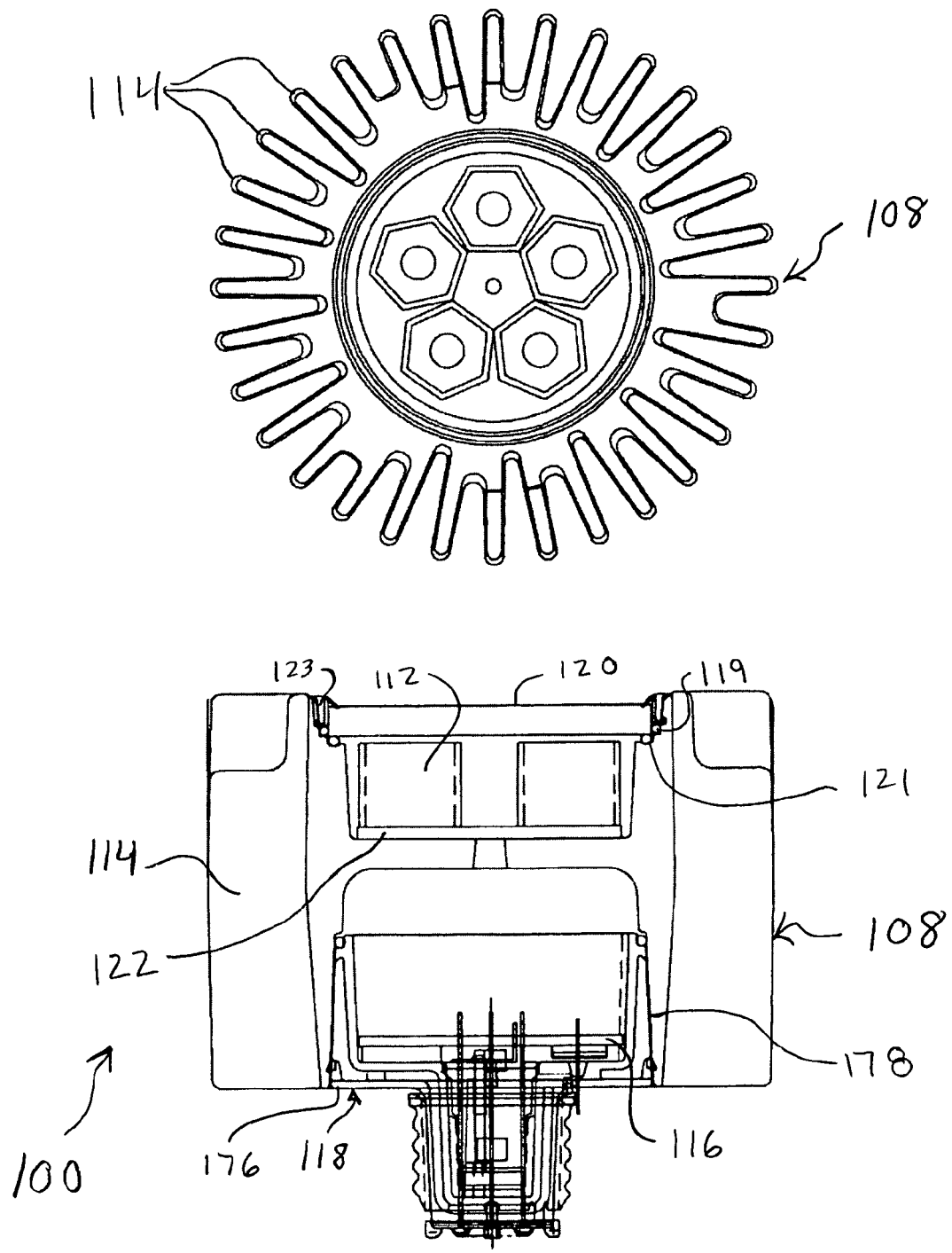
FIG. 3 is a cross sectional view of a PAR30 LED based light engine along with a top plan view of same.
Figure 4:
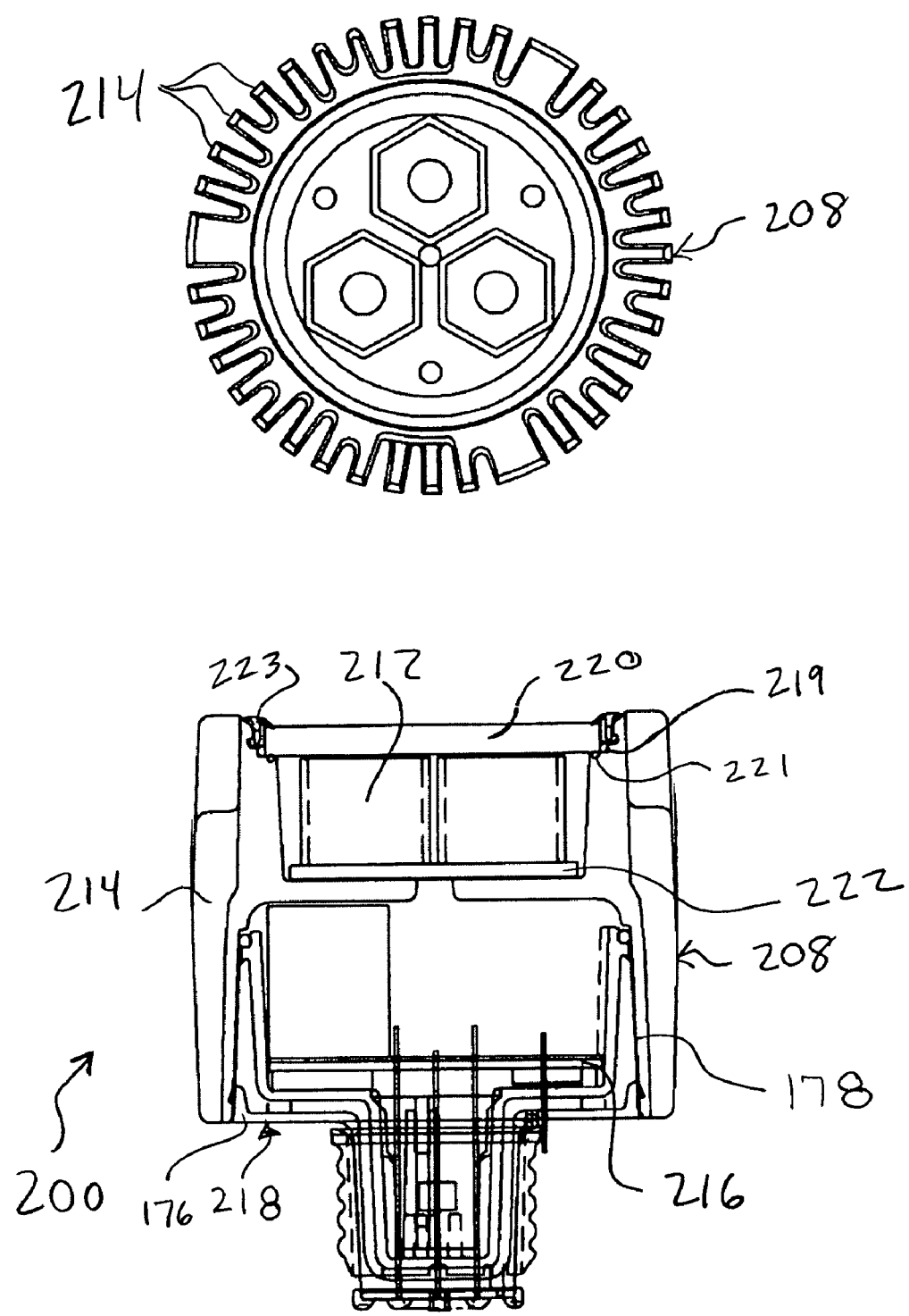
FIG. 4 is a cross sectional view of a PAR20 LED based light engine along with a top plan view of same.

An LED based light engine in accordance with the present disclosure configured as a PAR30 and PAR20 lamp are shown in FIGS. 3 and 4 respectively. The LED based light engine 100, 200 includes an LED light module 112, 212 for producing visible light and a housing 108, 208 for supporting the LED light module and an electronic current driver board 116, 216. The housing 108, 208 includes a heat sink mechanism 114, 214, e.g., fins, for conducting heat away from the LEDs of the LED light module. The engine 100, 200 further includes a base 118, 218 for coupling the current driver board 116, 216 to a power source and a window or lens 120, 220 for sealing the engine. The lens 120, 220 seals the unit against the environment using dual O-rings (e.g., 119, 121 as shown in FIG. 3 and 219, 221 as shown in FIG. 4) and also provides a simple mechanism for cleaning when exposed to the environment. The lens 120, 220 is preferably glass and will be epoxied to the housing 108; however, other transmissive materials may be employed. The lens 120, 220 will be further supported by a retaining ring 123, 223 which snaps into the housing 108.

Figure 5:
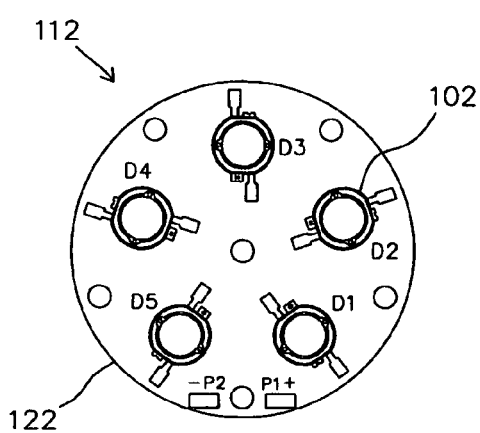
FIG. 5 is a top plan view of a LED board according to an embodiment of the present disclosure.

Referring to FIG. 5, the LED light module 112 for the LED PAR 30 lamp embodiment is composed of a light source that has five LED devices 102 consuming up to 4 Watts of power each, mounted to a metal core printed circuit board (PCB) 122. An exemplary LED device is a Luxeon K2 commercially available from Lumileds Lighting, U.S., LLC of San Jose, Calif. The metal core PCB 122, via conduction, moves the heat generated by the LEDs 102 to the housing 108 and fins 114. The board 122 has provisions for five mounting holes and a center hole for routing wiring that powers the LEDs 102.

Figure 6:
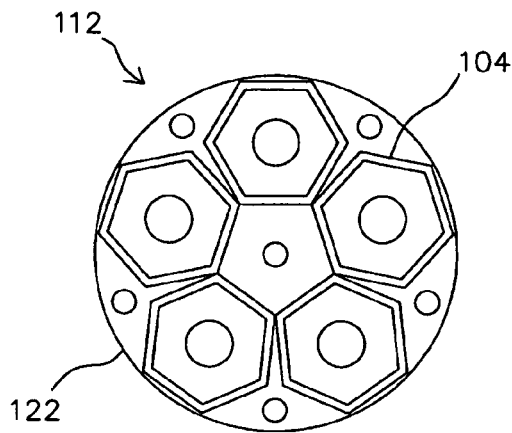
FIG. 6 is a top plan view of the LED board shown in FIG. 5 with an LED and optical element mounted thereon.

An optical element 104 is place over each LED 102 to efficiently (>75%) capture the light exiting the LED device 102 and channel it towards its intended target, as shown in FIG. 6. The individual optical elements will create a spot with a total angle of 6, 10, or 25 degrees, depending upon the optical properties of the lens selected. The five LED/optics combinations are arranged in a pentagon shaped fashion to produce a uniform and circular combined light beam. A filter (e.g., absorptive, dichroic, etc.) may optionally be placed inside of the optical element or on the outside of the optical elements to perform color correction functions.

The glass or plastic (polycarbonate or acrylic) front lens 120 encloses the LED module 112 within the heat sink housing 108 to form a seal using a dual O-ring system. An epoxy is used to bond the lens to the heat sink and provide an additional seal against humidity, moisture and dust. A snap-in trim ring 123, 223 provides a secondary mechanism to retain the front lens and as a safety feature to prevent the lens from falling out, should the epoxy fail for some reason.

Figure 7:
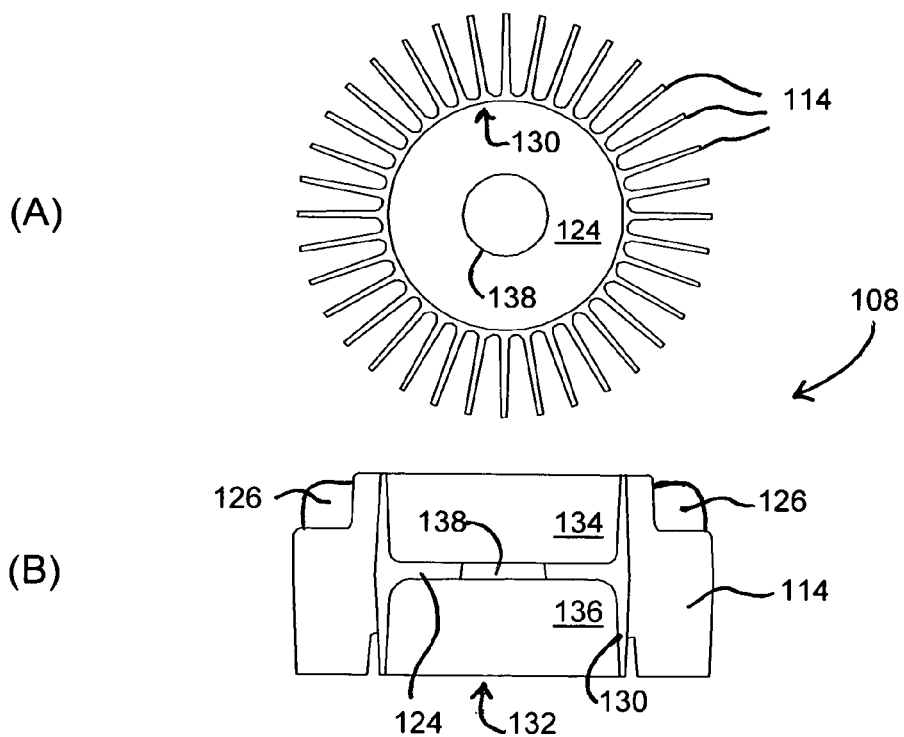
FIG. 7A is a top plan view of a heat sink mechanism of the LED based light engine and FIG. 7B is a cross sectional view of the heat sink mechanism.

Referring to FIG. 7, the heat sink housing 108 provides the dual purposes of being the mechanical enclosure for the LED light engine components and for transferring heat to the host light fixture 110 or ambient air environment. The housing 108 includes a generally cylindrical wall 130 defining a cavity 132. The cylindrical wall 130 includes an inner surface and an outer surface, the anodized outer surface including a plurality of axially radiating fins 114. Disposed on the inner surface of the wall 130 is an annular center wall 124 dividing the cavity 132 into a first, upper cavity 134 and a second, lower cavity 136. The annular center wall 124 includes an aperture 138 for allowing access from the first cavity 134 to the second cavity 136 for example for electrical wiring. Preferably, the housing 108 is constructed from aluminum, and alternatively, may be molded from a thermally conductive plastic.

The center wall 124 of the aluminum heat sink 108 mates to the LED light module 112 to transfer heat from the LED devices to the outside of the heat sink housing 108. A lower side of the metal core PCB 122 of the LED light module 112 is substantially in full contact with an upper surface of the center wall 124 providing a large surface area for heat transfer from the LED devices to the heat sink housing 108. The system of fins 114 provides the optimum surface area and shape to transfer the maximum amount of heat, through radiation and convection methods, to the host light fixture enclosure or outside ambient air environment. It is optimized to dissipate 25 Watts of heat while maintaining LED junction temperatures under 109 degrees C. and electronic driver board temperatures under 85 degrees C. while enclosed in a sealed host light fixture with an average outside temperature of 54 degrees F. (i.e., published average annual temperature in continental US). In some embodiments, the fins will be configured to have the same shape as the host lighting fixture. In other embodiments, the fins will be configured to contact the host lighting fixture to aid in conducting heat to the ambient environment.

The heat sink fins are designed in such a way as to provide a "finger grip" area 126 to aid in applying torque during installation or removal. In one embodiment, at least two diametrically opposed fins 114 will have a portion cut away to create the finger grip area.

The internal electronics driver board 116 is a compact design to fit within the heat sink housing 108 and base assemblies 118. Referring to FIG. 8A, in one embodiment, the driver board 116 includes an upper portion 140 and a lower portion 142. The upper portion 140 includes two side walls 144 and a tab 146 including output terminals 148. The two side walls 144 are configured to come into contact with the inner surface of the second cavity 136 when the driver board 116 is disposed in the housing 108. Furthermore, the tab 146 will be dimensioned to fit into aperture 138 of the center wall 124 facilitating an electrical connection between the output terminals 148 and the LED light module 112. The lower portion 142 of the driver board is dimensioned to be disposed in the base 118 with an interference fit. Additionally, the lower portion 142 will include input terminals 150 for receiving an input voltage from a power source.

In another embodiment, the driver board will include a circular electronics board 152 as shown in FIGS. 8B and 8C. The circular electronics board 152 will be disposed in the lower cavity 136 of the housing 108 and will be supported by an input power filter board 154 as shown in FIG. 8D. The filter board 154 is configured to include a lower end 156 dimensioned to be inserted into the base 118 and an upper end 158 configured to support the circular board 152 in a perpendicular arrangement relative to the longitudinal axis of the housing 108. The filter board 154 is electrically coupled to the driver circuit board 152 and receives input power form the base and provides filtered and/or conditioned power to the driver circuit board 152.

Regardless of the physical configuration of the current driver board, a schematic diagram of the components of the current driver board is illustrated in FIG. 9. The electronics driver board 116 uses a switching regulator U1 (e.g., Supertex HV9931) to efficiently convert input line voltage (e.g., 115 VAC/220 VAC/270 VAC) to a constant current required of the LED devices. The electronics design provides input power transient protection so that input power fluctuations will not damage the circuit components. A current driver circuit provides constant current at up to 1.1 amps to the LEDs, independent of fluctuations in input voltage. EMI filtering components are provided to keep noise generated within the electronics board from exiting the lamp assembly. The electronics is designed to provide Power Factor of greater than 90.

The electronics board 116 is grounded to the heat sink 108 so that the heat sink's metallic structure acts as a Faraday shield for suppression of radiated electromagnetic interference (EMI). The electronics board is mated to the base as shown in FIGS. 3 and 4.

Figure 10:
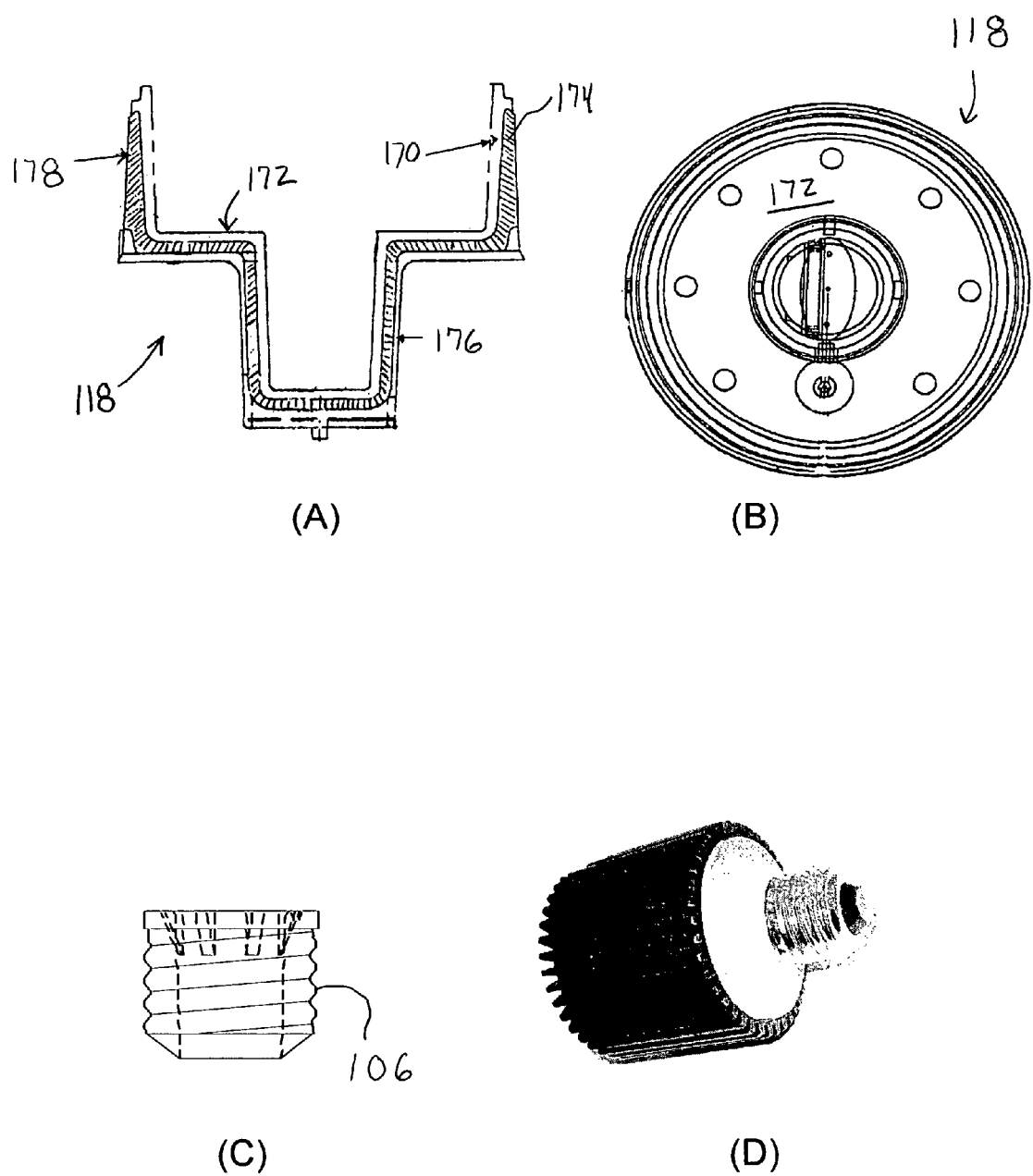

The base 118, shown in FIG. 10, is common between the PAR 30 and PAR 20 versions of the LED based light engine and provides the structure for mechanical and electrical mating to the host light fixture. It supports the electronics board 116 and mates to the heat sink 108 using an epoxy adhesive for a seal to resist moisture intrusion. The base 118 includes an inner plastic base 170 which supports the electronics board 152 on surface 172. The inner base 170 may be formed from any electrically insulating material and will protect the electronics board 152 from coming into contact with the metal housing 108. The inner base 170 is disposed in a center base 174 which is configured in substantially the same shape as the inner base 170; the inner base 170 is in full contact with the center base 174. The base 118 further includes an outer base 176 which is configured in substantially the same shape as the center base 174. The outer base 176 is preferably made from plastic; however, other materials may be used. The outer base 176 is configured to couple to the lower cavity of the housing 108 as shown in FIGS. 3 and 4. In one embodiment, the outer base 176 will snap-fit into the lower cavity of the housing 108. The base 118 has copper leads molded in to transfer electrical power from the host fixture to the electronics board 116 or input filter board 154. Adapter 106 is for supporting electrical and mechanical mating to an Edison type socket. In operation, the electronics board 152 mounts to the plastic inner base 170 of the base assembly 118. Heat generated by the electronic components move from the PCB board 152 to the plastic inner base 170, then to the center base 174 which is preferably made from a thermally conductive material, e.g., aluminum. A cylindrical surface 178 of the center base 174 is configured to be in contact with the housing 108 as shown in FIGS. 3 and 4. The heat from the center base 174 then moves to the housing 108 and is further dissipated through the fins 114, 214. In this manner, heat generated by the electronics disposed in the lower cavity of the housing 108 is efficiently drawn away from the electronic components and the LED device(s) 102.

Referring to FIGS. 11A and B, the hard mount receptacle connection embodiment is illustrated. The dedicated receptacle method provides a hard mount scheme which provides more security and better heat transfer to the host lighting fixture. The receptacle 180 directly mounts to the host light fixture 182 with a mating area that provides an efficient means for heat transfer from the LED based light engine 100. In this embodiment, the LED based light engine 100 uses a "twist lock" base 184 (in place of the Edison screw base 106) to securely engage the receptacle 180. The twist lock base 184 engages the lock ring 186 of the receptacle and the outer base 176 of the base assembly engages a die cast "spider spring" which is coupled to the host fixture 182. Heat generated by the light engine will move from the cavity of the housing 108 to the base assembly 118 which will transfer the heat to the spring 188. The spring 188 will then move the heat to the host fixture 182.

An optional thermal management control feature measures the internal operating temperature of the LED based light engine 100 and automatically reduces power if the lamp is exposed to extreme ambient temperature conditions or shuts off current at a specified PCB temperature, e.g., a predetermined threshold value, and automatically restarts when temperature falls below the threshold value. In one embodiment, a semiconductor temperature sensor 155 will be provided on the current driver board 116 to sense the temperature of the cavity 132 of the housing 108. An exemplary temperature sensing integrated circuit is Model number MAX6509HAUK+T, commercially available from Maxim Integrated Products, Inc. of Sunnyvale, Calif. In this embodiment, an output 157 of the temperature sensor 155 (illustrated as a dashed line) will connect to pin 5 of switching regulator U1 (in lieu of pin 5 going to pin 6). Pin 5 of switching regulator U1 is a PWM control interface that either allows the regulator to reduce average power going to LED or to turn off the power altogether.

In another embodiment, the LED based light engine uses an external driver electronics (e.g., separate housing or enclosure) that will allow the host fixture and LED based light engine 100 to operate in higher ambient temperatures. Referring to FIG. 12, the current driver board 116 will not be mount in lower cavity 136 of housing 108 but will be located external to the housing 108. Optionally, the external driver will be mounted in a small electronics enclosure 160 that can be located elsewhere in the host fixture or external to the host light fixture (not shown). Input power 162 (e.g., 115/220 VAC) will be supplied to the remotely located enclosure 160. The current driver 116 disposed in the enclosure 160 will provide drive current 164 (e.g., 100 mA) to the LED module 112 and receive return current 166. By remotely locating the current driver circuit, the LEDs 102 of the LED light module 112 can actually handle a higher junction temperature than the electronics circuit board 116. By removing the electronics, the heat sink (e.g., housing 108) will be allowed to get hotter and LEDs will still be operable.

An LED based light engine has been provided. The LED based light engine of the present disclosure is intended for residential and commercial applications where energy savings over incandescent lights are desirable and/or maintenance costs of replacing standard bulbs, over a given payback period, exceeds the acquisition cost of the LED PAR 30/PAR20 lamp. It is targeted for 30% savings in total cost of ownership over a 5 year period.

While the disclosure has been shown and described with reference to certain preferred embodiments thereof, it will be understood by those skilled in the art that various changes in form and detail may be made therein without departing from the spirit and scope of the disclosure.

What is claimed is:

1. A light engine comprising:
    a thermally conductive housing configured for supporting a light module and a current driver circuit and for conducting heat away from the light module and the current driver circuit, the housing including a generally cylindrical wall disposed along a longitudinal axis of the housing and defining a cavity, the cylindrical wall includes an inner surface and an outer surface, a plurality of fins radiating outwardly from the outer surface of the cylindrical wall, each of the plurality of fins running length-wise parallel to the longitudinal axis of the housing, and an annular center wall extending inwardly from the inner surface of the cylindrical wall being substantially perpendicular to the longitudinal axis of the housing and dividing the cavity into a first, upper cavity and a second, lower cavity;
    the light module including at least one light emitting diode (LED) for producing visible light mounted to a circular metal core printed circuit board, the light module completely disposed in the first, upper cavity and the circular metal core printed circuit board being substantially in full contact with an upper surface of the annular center wall, wherein heat generated by the at least one LED is conducted to the housing via the circular metal core printed circuit board;
    the current driver circuit arranged on a substrate having an upper portion of a first width tapering to a lower portion of a second width, the first width being greater than the second width, the upper portion including two side walls configured to come into contact with the inner surface of the second, lower cavity of the base, the upper portion further including a tab, with output terminals, dimensioned to fit into an aperture of the annular center wall to facilitate an electrical connection between the output terminals and the at least one LED, the lower portion extending away from the housing along the longitudinal axis; and
    a base configured for receiving input power and coupling the input power to the current driver circuit, the base being dimensioned to be disposed over the lower portion of the current driver circuit substrate with an interference fit.

2. The light engine as in claim 1, further comprising a lens for sealing the light module within the housing, the lens being configured to mate to an open end of the first, upper cavity.

3. The light engine as in claim 2, further comprising a trim ring configured to be disposed about the lens for securing the lens to the open end of the housing.

4. The light engine as in claim 1, further comprising an optical element disposed over the at least one LED for channeling light emitting from the at least one LED.

5. The light engine as in claim as in claim 1, wherein the housing is aluminum or thermally conductive plastic.

6. The light engine as in claim 1, wherein at least two diametrically opposed fins include a cut away portion to define a grip area to facilitate installation.

7. The light engine as in claim 1, wherein a lower portion of the current driver circuit substrate is configured to be disposed in the base.

8. The light engine as in claim 1, wherein the housing is configured from an electrically conductive metal.

9. The light engine as in claim 8, wherein the substrate of the current driver circuit is ground to the housing, wherein the housing acts as a Faraday shield for suppression of related electromagnetic interference (EMI).

10. The light engine as in claim 1, further comprising a temperature sensor coupled to the current driver circuit, wherein if the sensed temperature arises above a predetermined threshold value, the current driver circuit reduces or shuts off current to the light module.

* * * * *